US012651329B2

(12) United States Patent
King et al.

(10) Patent No.: US 12,651,329 B2
(45) Date of Patent: Jun. 9, 2026

(54) SYSTEM, DEVICE AND METHOD FOR DETECTION OF COUNTERFEIT ELECTRONIC PRODUCTS

(71) Applicant: MOTOROLA SOLUTIONS, INC., Chicago, IL (US)

(72) Inventors: Melanie King, Wesley Chapel, FL (US); Scott A Greven, Lehigh Acres, FL (US); Lisajane M Romer, Delray Beach, FL (US); Max N Rosenfeld, Oakland Park, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 332 days.

(21) Appl. No.: 18/498,819

(22) Filed: Oct. 31, 2023

(65) Prior Publication Data

US 2025/0139758 A1 May 1, 2025

(51) Int. Cl.
*G06T 7/00* (2017.01)
*G06V 20/80* (2022.01)
*G06V 30/10* (2022.01)

(52) U.S. Cl.
CPC ............ *G06T 7/0008* (2013.01); *G06V 30/10* (2022.01); *G06T 2207/10116* (2013.01)

(58) Field of Classification Search
CPC ........ G06T 7/0008; G06T 2207/10116; G06V 30/10; G06V 20/80
See application file for complete search history.

(56) References Cited

U.S. PATENT DOCUMENTS

2004/0013285 A1* 1/2004 Jordan ................... G07D 7/004
382/100
2008/0129746 A1* 6/2008 Hanazato ............... G06K 15/02
345/505

(Continued)

FOREIGN PATENT DOCUMENTS

EP 2090883 A1 8/2009
EP 3652526 B1 8/2021

(Continued)

OTHER PUBLICATIONS

Chen, Fei, et al. "Embedded product authentication codes in additive manufactured parts: Imaging and image processing for improved scan ability." Additive manufacturing 35 (2020): 101319. (Year: 2020).*

*Primary Examiner* — Amandeep Saini
*Assistant Examiner* — Andrew S Budisalich
(74) *Attorney, Agent, or Firm* — Barbara R Doutre

(57) ABSTRACT

System, device and method are provided for inspection of electronic products. The method includes receiving, at a server electronic processor, x-ray image(s) associated with an electronic device. Image analytics are performed on the x-ray image(s) to identify a plurality of different fragmented signature portions disposed within the electronic device. The plurality of fragmented signature portions are collected, and a determination is made whether the collected fragments are combinable to form a complete signature based on pre-approved fragment images and fragment location stored in a memory of the server. The server generates a notification indicating: a valid, non-counterfeit product in response to determining a complete combined signature, with no missing fragment; a counterfeit component or counterfeit module in response to a missing fragment; and a counterfeit elec- (Continued)

tronic product in response to a determination of all fragments missing.

26 Claims, 6 Drawing Sheets

(56) References Cited

U.S. PATENT DOCUMENTS

| | | | |
|---|---|---|---|
| 2010/0089804 A1* | 4/2010 | Lambert | G07D 7/1205 |
| | | | 250/361 R |
| 2012/0127423 A1* | 5/2012 | Blum | G02C 7/083 |
| | | | 351/158 |
| 2017/0160320 A1 | 6/2017 | Gonzalez et al. | |
| 2017/0228629 A1* | 8/2017 | Albinyana | G06K 1/121 |

| | | | |
|---|---|---|---|
| 2018/0121758 A1* | 5/2018 | Betts-Lacroix | G06V 40/10 |
| 2018/0136145 A1* | 5/2018 | Bryant | G06T 7/001 |
| 2019/0286896 A1* | 9/2019 | Wyle | G06V 30/416 |
| 2020/0349353 A1* | 11/2020 | Guo | G06F 18/22 |
| 2021/0012054 A1* | 1/2021 | Adler | G01T 1/20 |
| 2021/0159649 A1* | 5/2021 | O'Keeffe | H01R 24/28 |
| 2021/0325323 A1* | 10/2021 | Grof | G01N 23/22 |
| 2022/0121733 A1* | 4/2022 | Mckell-Redwood | G06F 9/455 |
| 2022/0343497 A1* | 10/2022 | Buurma | A61B 5/015 |
| 2022/0351517 A1* | 11/2022 | Mousavi | G06T 3/02 |
| 2024/0103359 A1* | 3/2024 | Zhou | G03F 1/82 |
| 2025/0045538 A1* | 2/2025 | Butler | G06K 1/121 |

FOREIGN PATENT DOCUMENTS

| | | |
|---|---|---|
| WO | 2010020407 A2 | 2/2010 |
| WO | 2013131073 A1 | 9/2013 |

* cited by examiner

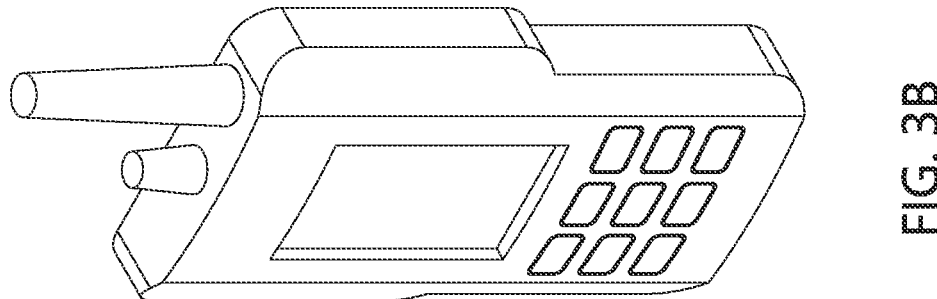
FIG. 3B
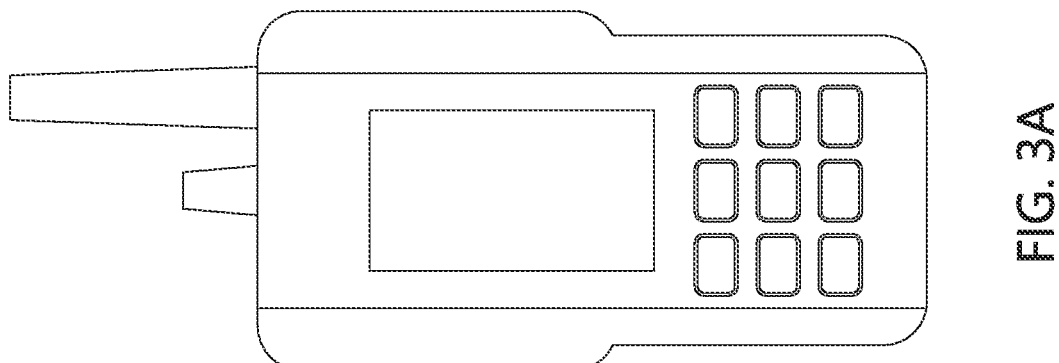
FIG. 3A
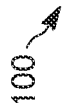
100

600

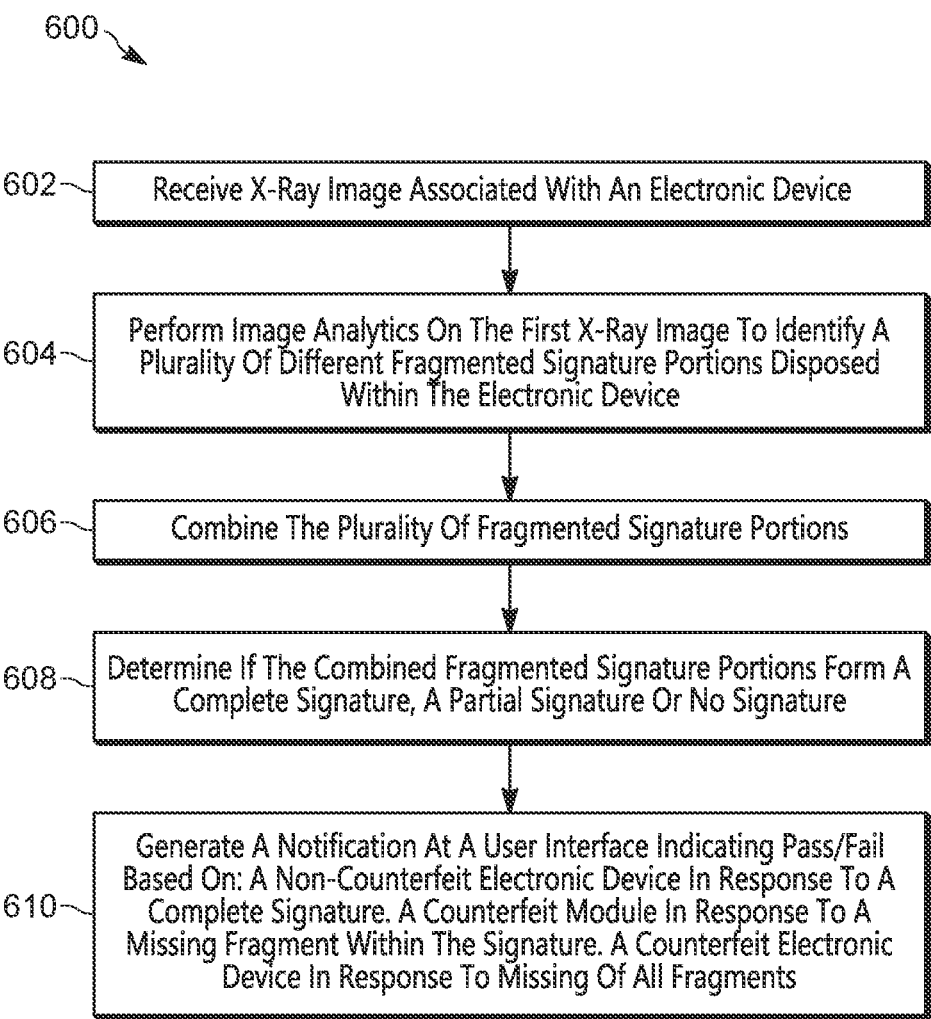

602 — Receive X-Ray Image Associated With An Electronic Device

604 — Perform Image Analytics On The First X-Ray Image To Identify A Plurality Of Different Fragmented Signature Portions Disposed Within The Electronic Device 606 — Combine The Plurality Of Fragmented Signature Portions 608 — Determine If The Combined Fragmented Signature Portions Form A Complete Signature, A Partial Signature Or No Signature 610 — Generate A Notification At A User Interface Indicating Pass/Fail Based On: A Non-Counterfeit Electronic Device In Response To A Complete Signature. A Counterfeit Module In Response To A Missing Fragment Within The Signature. A Counterfeit Electronic Device In Response To Missing Of All Fragments

FIG. 6

SYSTEM, DEVICE AND METHOD FOR DETECTION OF COUNTERFEIT ELECTRONIC PRODUCTS

BACKGROUND OF THE INVENTION

Cargo is inspected by customs and border protection (CBP) personnel before entry into a designated country. The detection of counterfeit public safety products, such as public safety portable radios, is particularly important. Even a portion of a public safety radio product being compromised might affect the ability of the overall product to operate properly under certain environments, such as fire, harsh weather and the like. Hence, counterfeit public safety radio products present potential dangers to end-users, such as firefighters and law enforcement personnel, as well as to the public being served by the personnel who rely on these devices. As manufacturing and assembly of electronic products may sometimes be outsourced to offshore third party facilities, it is important to ensure that the authenticity of a product be maintained. What may be thought to be a mere substitution of a component or module could have a negative impact on product operation in the field.

Accordingly, the ability to inspect public safety electronic products is highly desirable.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments, examples, aspects, and features that include the claimed subject matter, and explain various principles and advantages of aspects of those embodiments, examples, aspects, and features.

FIG. 3A shows a front view of the portable radio of FIG. 1 in accordance with some embodiments.

FIG. 3B shows a perspective view of the portable radio of FIG. 1 in accordance with some embodiments.

FIG. 6 is a flowchart of a method for electronic product inspection in accordance with some embodiments.

Figure 1:
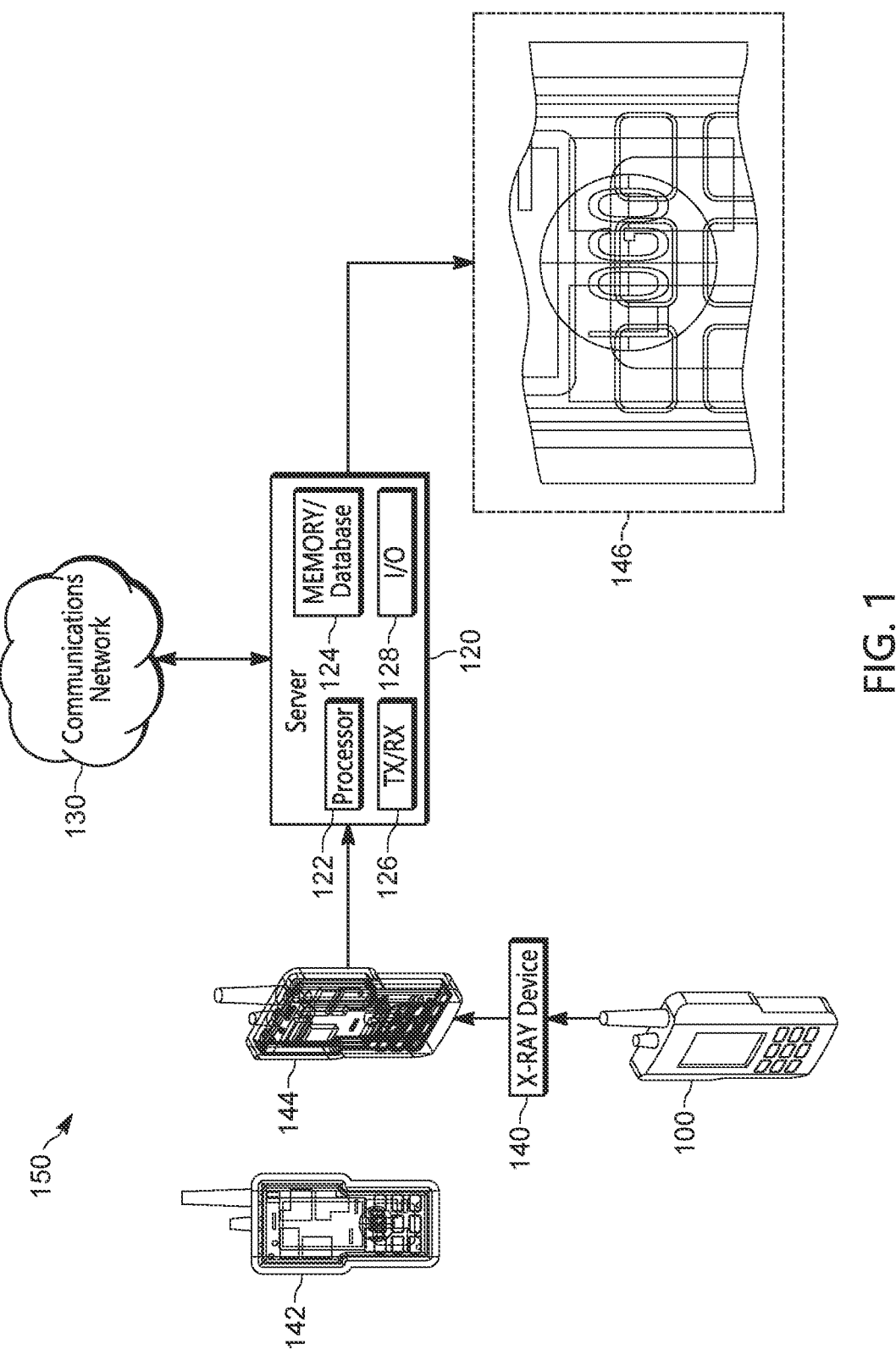
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples disclosed herein.

The apparatus and method components have been represented where appropriate by conventional symbols in the drawings, showing only those specific details that are pertinent to understanding the embodiments, examples, aspects, and features so as not to obscure the disclosure with details that will be readily apparent to those of ordinary skill in the art having the benefit of the description herein.

It should be understood that although certain figures presented herein illustrate hardware and software located within particular devices, these depictions are for illustrative purposes only. In some examples, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

DETAILED DESCRIPTION OF THE INVENTION

Briefly, there is provided herein a device, system and method for detection of counterfeit electronic products. In one embodiment, a portable electronic device, such as a portable radio, comprises a housing containing a plurality of electronic modules and components, a fragmented signature marking dispersed amongst the housing and electronic modules and components, the fragmented signature marking being invisible to a human eye and detectable by an x-ray device through a sealed package within which the portable radio is contained. The fragmented signature marking is configured to form a processor detectable image wherein: a complete combined signature marking, with no missing fragment, indicative of a valid, non-counterfeit radio; a missing fragment being indicative of a counterfeit component or counterfeit module; and a missing of all fragments is indicative of a counterfeit radio.

In another embodiment, a communication system for electronic device inspection is provided. The communication system comprises: a server having an electronic processor configured to: receive an x-ray image associated with an electronic device at a cargo entry point; perform image analytics on the x-ray image; identify a plurality of different fragmented signature portions disposed within the electronic device; automatically collect the plurality of different fragmented signature portions; determine if the collected fragmented signature portions are combinable to form a complete signature; and generate a notification indicating the authenticity of the electronic device. The notification indicates a valid, non-counterfeit radio in response to a complete combined signature, with no missing fragment; a counterfeit component or counterfeit module in response to missing a fragment of a complete signature; and a counterfeit electronic device in response to missing all fragments of a complete signature.

In another embodiment, a method for inspecting an electronic device is provided. The method comprises receiving, at a server electronic processor, an x-ray image associated with an electronic device; performing, using the server electronic processor, image analytics on the x-ray image; identifying a plurality of different fragmented signature portions disposed within the electronic device; automatically collecting the plurality of fragmented signature portions; determining if the collected fragments are combinable to form a complete signature; and generating a notification indicating a non-counterfeit electronic device in response to a complete combined signature, with no missing fragments; a counterfeit component or counterfeit module of the electronic device in response to a missing fragment; and a counterfeit electronic device in response to missing all fragments.

FIG. 1 is a block diagram of a communication system 150 for inspecting an electronic device 100, the system being formed and operating in accordance with some embodiments. The communication system 150 includes a server 120 operating within, or as part of, a communications network, such as cloud-based network 130. The communication system 150 includes an x-ray device 140 communicatively coupled, wired or wirelessly, to the server 120. The server 120 and x-ray device 140 may preferably be located at a customs and border protection (CBP) agency or other product inspection location. The electronic device 100 may be a radio, such as a portable public safety two-way radio, mobile two-way radio, smart telephone, smart wearable device, or the like. The communication network 130 may operate over one or more wireless or wired networks, for example, a Wi-Fi® network, a cellular network, the Internet, to name a few.

The server 120 includes an electronic processor 122 (also referred to as server electronic processor or simply processor), a memory database 124 (referred to as memory), a transceiver 126, and an input/output interface 128. The input/output interface 128 may include, or be operatively coupled to, an electronic display, keypad, touchscreen, and/ or other suitable electronic user interface. The electronic processor 122, the memory 124, the transceiver 126, and the input/output interface 128 communicate over one or more control and/or data buses. The server 120 may include more or fewer components and may perform functions other than those explicitly described herein.

The electronic processor 122 may be implemented as a microprocessor with separate memory or may be implemented as a microcontroller (with memory integrated therein). The electronic processor 122 may be implemented partially or entirely as, for example, a field-programmable gate array (FPGA), an applications specific integrated circuit (ASIC), an x86 processor, to name a few.

Memory 124 includes non-transitory, computer-readable memory that stores instructions that are received and executed by the electronic processor 122 to carry out the functionality of the server 120 described herein. The memory 124 may include, for example, a program storage area and a data storage area. The program storage area and the data storage area may include combinations of different types of memory, such as read-only memory and random-access memory.

In accordance with some embodiments, the memory 124 includes stored images and data associated with product marking information including pre-approved fragmented signature portions and unified signature(s) associated with an electronic device. Approved manufacturers may upload the approved marking information over the network 130 to the server 120, and the processor 122 stores the approved product marking information within the memory 124. Periodic updates may be made by the approved manufacturer and such updates to the approved marking information may be communicated to the server 120.

The input/output interface 128 may include, or be coupled to, an electronic display, keypad, touchscreen, and/or the like. The input/output interface 128 of server 120 may include one or more input mechanisms (for example, a touch pad, a keypad, a microphone, and the like), one or more output mechanisms (for example, a display, a speaker, and the like), or a combination thereof, or a combined input and output mechanism such as a touch screen.

In accordance with some embodiments, the transceiver 126 may be wired and/or wirelessly coupled between the server 120 and the x-ray device 140. The transceiver 126, under the control of processor 122, enables communication over the communication network 130 and may receive image inputs from the X-Ray device 140 for processing, using image analytics, by the processor 122. The x-ray device 140 is controlled by the server 120, to trigger taking image scans of an electronic product, such as portable radio 100. Triggering image scanning of the x-ray device 140 may be controlled manually via input to the I/O interface 128 or automatically via pre-programmed instructions managed by the processor 122.

Image scans retrieved by the server 120 from the x-ray device 140 are processed through the processor's image analytics. In accordance with some embodiments, the processor 122 is configured to identify a plurality of different fragmented signature portions disposed within the electronic device, automatically collect the plurality of different fragmented signature portions, and determine, via image recognition, if the collected fragments are combinable to form a complete signature. For example, the determination of whether the collected fragments are combinable to form a complete signature may further include the processor being configured to generate processor generated electronic marking based on the collected fragments and identified locations to compare the processor generated electronic marking to a pre-approved signature stored within a memory of the server.

Individual fragments, multi-fragments, partial signatures and complete signature markings may be compared to the previously stored images within a database of memory 124 to determine the authenticity of the product. Individual fragments may be formed of different materials that may be detected via setting adjustments to brightness and contrast, such settings may be pre-set at the server and adjusted for predetermined product orientations.

The processor 122 further generates a notification indicating the authenticity of the portable radio. A notification indicating a valid, non-counterfeit radio is generated in response to a complete combined signature, with no missing fragment. A notification indicating a counterfeit component or counterfeit module is generated in response to missing a fragment of a complete signature. A notification indicating a counterfeit electronic device is generated in response to missing all fragments of a complete signature.

Images scanned by the x-ray device 140 are transmitted (wired or wirelessly) to the server 120. The x-ray device 140 may be, for example, an infrared device, or other type of device capable of detecting invisible ink or other types of non-visible spectrum imaging. The x-ray device 140 may include known dual energy, such as, material discrimination x-ray (MDX), which can distinguish different types of material (the main distinction being organic, inorganic, or metal). Such x-ray devices, used in some TSA applications, can scan in one or two planes and generate colored 2D image (orange, purple, green) based on the energy levels absorbed by the materials. The X-ray device 140 may include a CT (computer tomography), which rotates 360° and constructs a full 3D model of the target, such as used in hospitals and recently in some airports. Single energy x-ray may also be used, but may be limited to viewing a dense object inside a less-dense medium (fewer levels of detection than dual energy x-ray). However, the x-ray energy can be adjusted between scans to penetrate more- or less-dense materials.

The fragmented signature may have contrasting material and/or contrasting density from its surrounding enclosure, and placement that avoids overlapping with denser materials. For example, the signature may be made of copper foil (metal) or titanium dioxide (inorganic) where the enclosure is polycarbonate (organic).

The x-ray device 140 may be controlled by the server 120, automatically or in response to a user input to the I/O interface 128. The x-ray device 140 may, in some embodiments, receive orientation commands from the server 120, to manipulate the orientation of the electronic device 100 for scanning images in accordance with pre-stored orientations that will capture images of fragments at the various locations within or on the product. The electronic device 100 need not be powered on, and the product housing need not be opened up. The electronic device 100 may be boxed or unboxed, and the orientation commands from the server may be adjusted accordingly for device inside or outside of the box. Input to the I/O interface 128 may be entered to trigger the server instructions, which control the orientation of the device being scanned by the x-ray device 140.

In response to the server instructions, the x-ray device 140 scans one or more orientations 142, 144 of the portable radio 100. For example, a front x-ray image and a perspective x-ray image may be scanned by x-ray device 140 and sent to the server 120 for image analytics by processor 122.

The processor 122 performs image analytics on the scanned images to identify a unified signature marking in one of the orientations and to identify corresponding fragmented signature portions dispersed amongst the electronic modules and components of portable radio 100 in another orientation. The electronic processor 122 performs image analytics on the images to determine, for example, placement location of a signature fragment, logo dimensions, logo color and shape, of each fragment. In some examples, performing image analytics includes performing optical character recognition (OCR) and known image processing techniques to identify the location, color, shape, texture, density, size, volume, layout, and/or the like of the marking within the images. For example, a completed combined signature 146 may be determined by image analytics in the first x-ray scan of the radio 100 in the first orientation 142, and the fragmented signature portions dispersed amongst the housing and electronic modules and components may be determined by image analytics in the second x-ray scan of the radio in the second orientation 144. Depending on the placement of the fragmented portions, for example, the completed combined signature may be determined by image analytics of the first x-ray scan of the radio in the front orientation; and the fragmented signature portions dispersed amongst the housing and electronic modules and components may be determined by image analytics in the second x-ray scan of the perspective view of the radio. Fragmented signature portions will be discussed in more detail in further views.

While two orientations have been described, the embodiments further allow for a single orientation to be used as long as that orientation is one that captures the fragments portions dispersed on different elements of the radio. For example, the first scan orientation may be oriented with a position that detects fragmented portions of the signature. In this case, the processor analytics may be configured to identify the plurality of different fragmented signature portions disposed within the electronic device, automatically collect the plurality of fragmented signature portions, determine if the collected fragments are combinable to form a complete signature, and base the notification on that signature, as long as it matches the pre-approved stored unified signature. In other words, a second orientation scan (orientation that would show a complete signature) may not be required, if the fragmented portions can be collected to show a complete signature that matches a pre-approved signature stored in memory.

To summarize, the communication system 150 includes server 120 having an electronic processor 122 configured to receive, a first x-ray image associated with an electronic device, such as portable radio 100, at cargo entry point or other product inspection location. The electronic processor 122 is configured to perform image analytics on the first x-ray image, identify a plurality of different fragmented signature portions disposed within the electronic device, automatically collect the plurality of fragmented signature portions, and determine if the collected fragments are combinable to form the complete signature. The processor 122 generates a notification for output at the input/output user interface 128 indicating: a non-counterfeit radio in response to a complete combined signature, with no missing fragment; a counterfeit component or counterfeit module associated in response to a missing fragment; and a counterfeit electronic device in response to a missing of all fragments.

In accordance with further embodiments, limited access to the server 120 may be provided over the cloud-based network 130 to pre-approved manufacturers of electronic devices intended for inspection. The server 120 may be updated remotely with updated images of different fragmented signature portions and updated locations within the radio upon which the updated fragmented signature portions are disposed. The ability to update the server 120 remotely allows manufacturers the ability to generate different signatures for different releases of a radio and to change those signature markings over time. The ability to alter the marking's fragmented signature portions and location of the fragmented signature portions makes it more difficult for non-approved substitutions of components or modules to be used (whether deliberate or not).

Figure 2:
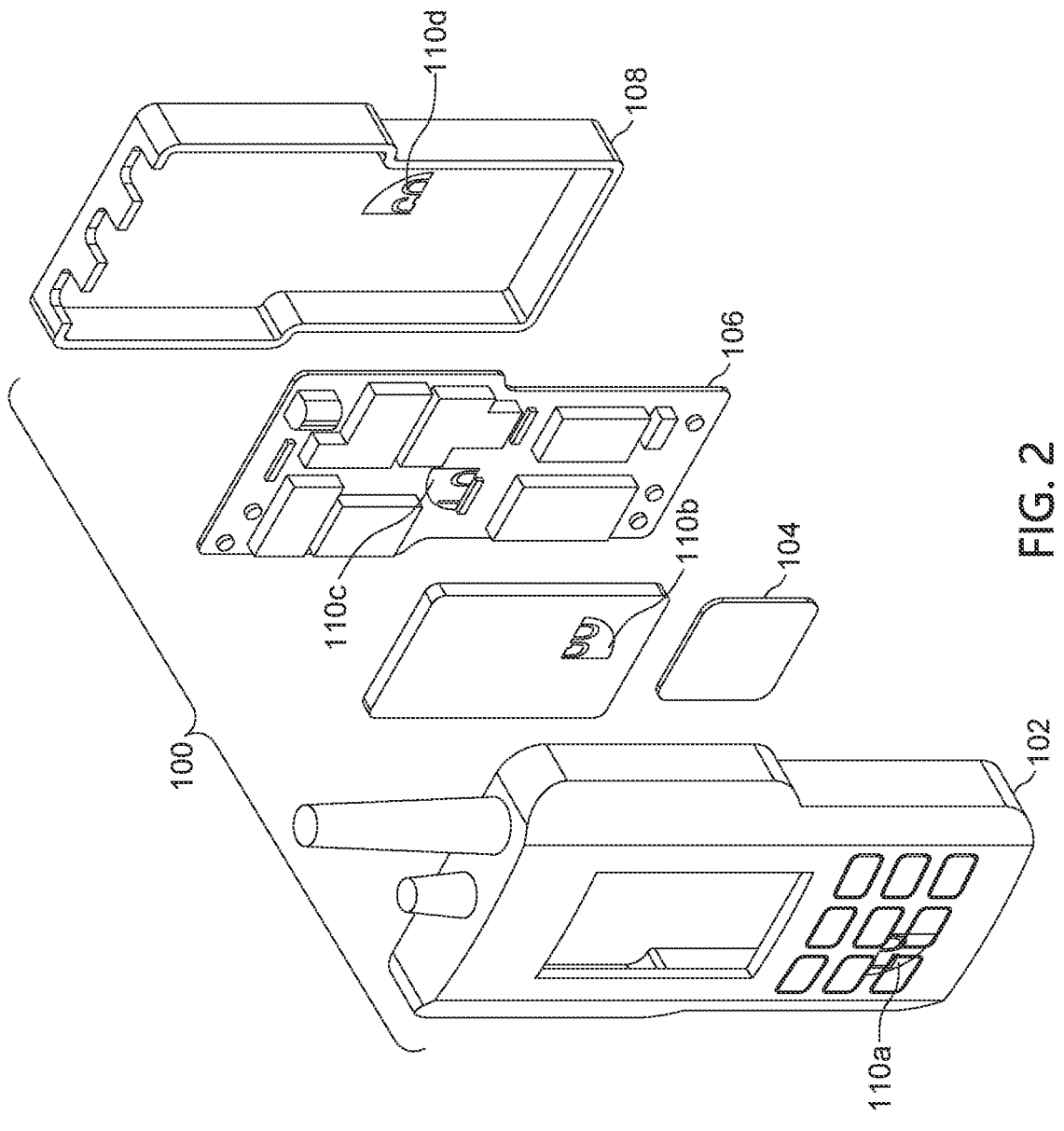
FIG. 2 is an exploded view of the portable radio of FIG. 1 in accordance with some embodiments.

FIG. 2 shows an exploded view of the portable radio 100 in accordance with some example embodiments. The portable radio 100 comprises a housing, shown here as front housing portion 102 and back housing portion 108. The housing contains a plurality of electronic modules and components 104, such as may be disposed on a printed circuit board (pcb) 106. In accordance with the embodiments, a fragmented signature portions 110a, 110b, 110c, 110d are dispersed amongst the front housing portion 102, the electronic modules and components 104, the printed pcb 106, and the back housing portion 108. In accordance with some embodiments, the fragmented signature portions may be invisible to the human eye and detectable by an x-ray device 140, such as that shown in FIG. 1. In some embodiments, the fragmented signature portions may be detectable under different lighting conditions and/or contrast conditions. The portable radio 100 may be contained within a sealed package (such as a box, not shown). In accordance with the embodiments, the detected fragmented signature portions 110a, 110b, 110c, 110d are configured to form a processor detectable image, wherein: a complete combined signature marking indicative of a valid, non-counterfeit radio; a missing fragment being indicative of a counterfeit component or counterfeit module; and a missing of all fragments being indicative of a counterfeit radio. The fragmented signature portions 110a, 110b, 110c, 110d may be printed, etched, or otherwise disposed on and dispersed amongst the housing, electronic modules and/or components of the electronic device 100 using materials detectable by an x-ray device.

Figure 4B:
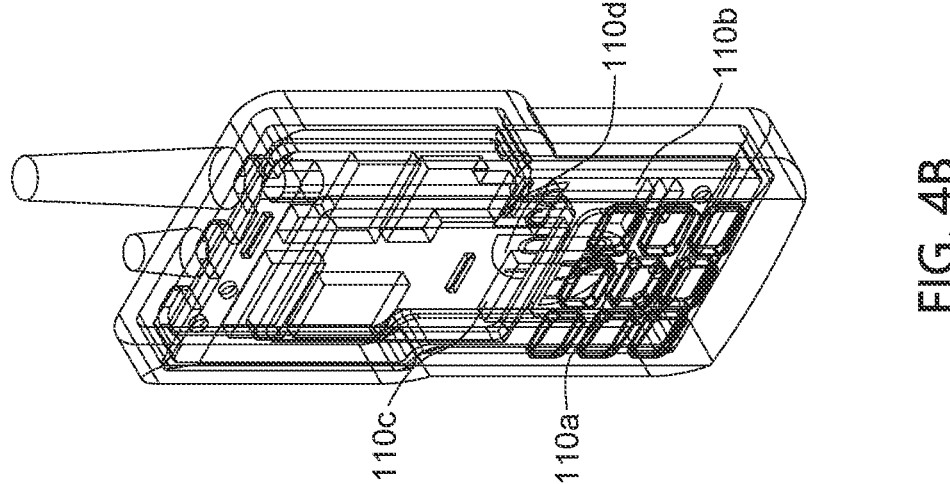
FIG. 4B shows an example illustration representing an x-ray scan of a perspective view of the portable radio of FIG. 1 showing fragmented signature portions on different modules and components in accordance with some examples.

Each fragmented signature portion 110a, 110b, 110c, 110d is preferably dissimilar, and placed at a different location on electronic modules and components. When electronically combined, the fragmented signature portions form a predetermined unified signature, such as a logo or other marking, for example as shown in more detail in FIG. 4A. FIG. 4B, and FIG. 5. The processor detectable image is configured for detection by image analytics for comparison to previously stored complete signatures, such as stored within the memory of 124 of server 120 of FIG. 1. Fragmented signature portions may be placed by manufacturers, authorized suppliers of components, and/or as part of approved assembly processes of the product. The dissimilar fragmented signature portions 110a, 110b, 110c, 110d may be placed in different pre-approved locations of the radio 100, which are accessible to x-ray detection. For example, in one radio orientation, the combined fragments may form a unified signature capable of being detected by an x-ray scan, and in another radio orientation, the fragmented signature portions may be dispersed across pre-approved locations, capable of being detected an x-ray scan.

FIG. 3A shows a first orientation position of the portable radio of FIG. 1 in accordance with some embodiments. The first orientation is shown in this example, as a front view of the portable radio; however, it is to be appreciated that the first orientation may be a different orientation, such as back, side, or perspective orientation. The orientation of the portable radio for a first x-ray scan may be controlled automatically by the server of FIG. 1, such as via pre-programmed orientation instructions, in accordance with a manufacturer's signature determination instructions. Input to the I/O interface 128 may be entered to trigger the server instructions, which control the orientation of the portable radio being scanned within the x-ray device 140.

FIG. 3B shows a second orientation position of the portable radio of FIG. 1 in accordance with some embodiments. The second orientation is shown in this example, as a perspective view of the portable radio; however, it is to be appreciated that the second orientation may be a different orientation, such as front, back, side, or other perspective orientations. The orientation of the portable radio for a second x-ray scan may be controlled automatically by the server of FIG. 1, such as via pre-programmed orientation instructions, in accordance with a manufacturer's signature determination instructions.

Figure 4A:
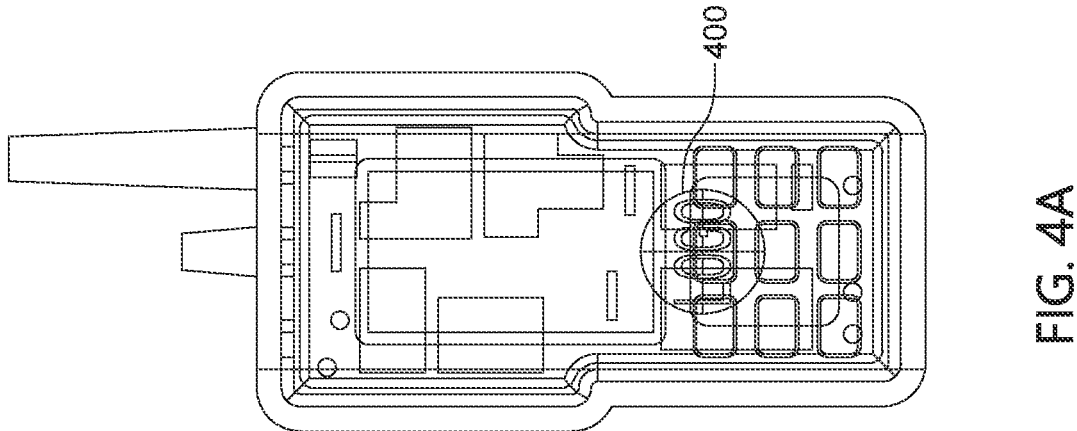
FIG. 4A shows an example illustration representing an x-ray scan of an of the front view of portable radio of FIG. 1 showing a fragmented signature portions combined into a unified signature marking in accordance in accordance with some embodiments.
Figure 5:
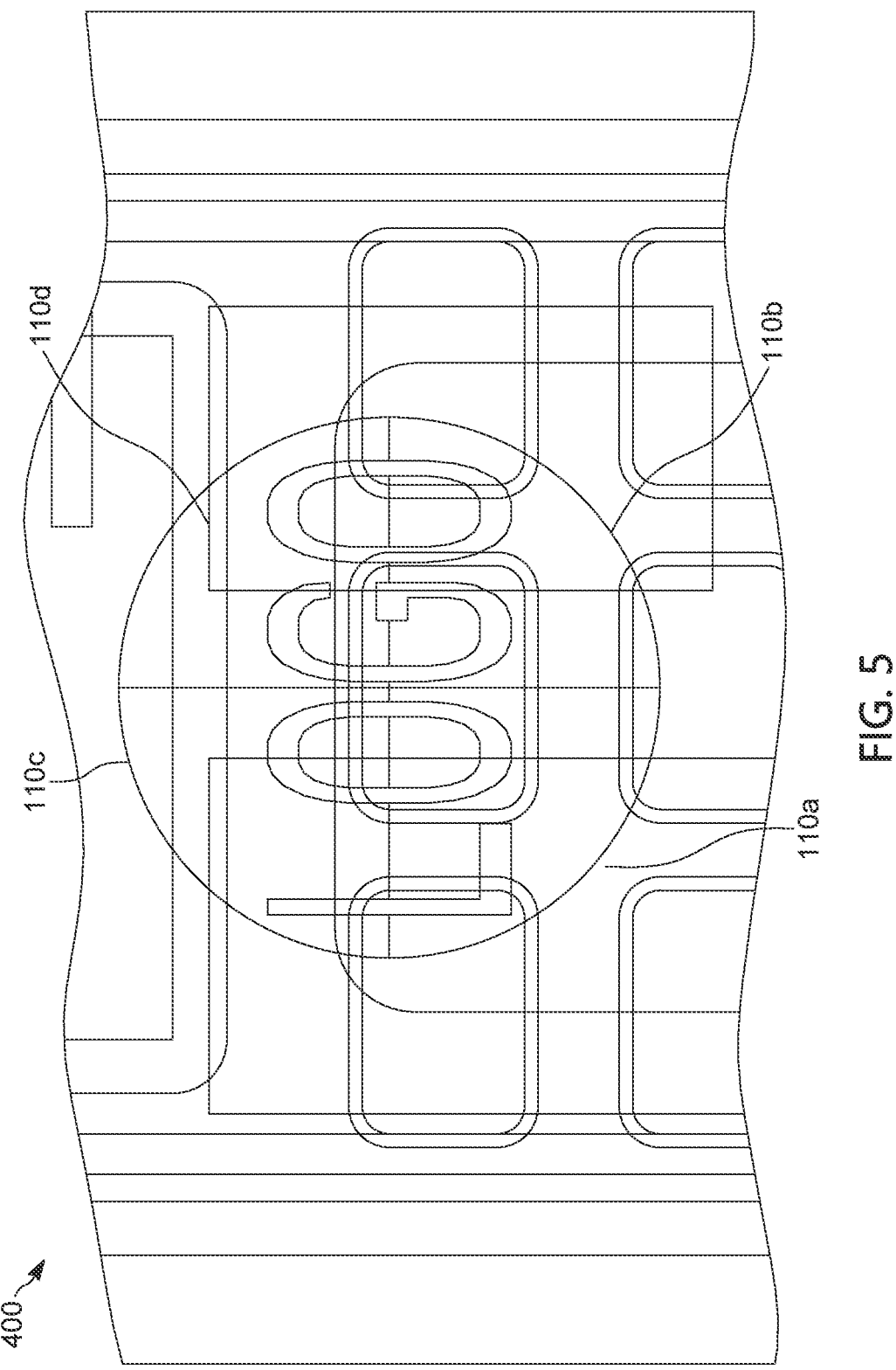
FIG. 5 shows an enlarged view of an example signature marking in accordance with some embodiments.

FIG. 4A shows an example illustration representing an x-ray scan of a first orientation of portable radio of FIG. 1 showing fragmented signature portions combined into a unified signature marking 400 in accordance with some embodiments.

FIG. 4B shows an example illustration representing an x-ray scan of a perspective view of the portable radio of FIG. 1 in accordance with some embodiments. As seen in the perspective view, the portable radio 100 includes a plurality of different fragmented signature portions shown as fragmented signature portions 110a, 110b, 110c, 110d dispersed amongst various portions of the device. For example, the fragmented signature portions 110a, 110b, 110c, 110d may be dispersed on different housing portions, modules and/or, such as was shown in FIG. 2. Each fragment 110a, 110b, 110c, 110d is preferably dissimilar, and when combined, form the unified signature, such as the LOGO shown of FIG.

4A, also shown as completed combined signature 146 in FIG. 1, (which is also shown in an enlarged view of a LOGO marking in FIG. 5.

Images of pre-approved fragmented signature portions and unified signature are stored within the memory 124 of server 120. Image analytics are performed by processor 122 to compare the detected fragments and locations to preapproved fragment images at pre-approved fragment locations of the device. Image analytics are performed to compare the unified signature to the predetermined stored unified image in memory 124. The dispersement of the signature across different portions of the radio and different orientations makes substitution of non-approved modules, components and/or housings more difficult for counterfeiters to try to substitute non-authentic parts.

Different unified signatures and associated fragments may be stored within the server for different products. The unified signatures and associated fragments for a given product. may be updated, such as for new releases of a radio product over time. The updated information may be uploaded to the server so that product inspections are kept current.

In some embodiments, the first scan orientation may be oriented with a position that detects the fragmented portions of the signature. In this case, the processor analytics may be configured to identify the plurality of different fragmented signature portions disposed within the electronic device, automatically collect the plurality of fragmented signature portions, determine if the collected fragments are combinable to form a complete signature, and base the notification on that signature. In other words, a second orientation scan (orientation that would show a completed signature) may not be required, if the fragmented portions can be collected to show a complete signature that matches a pre-approved signature stored in memory.

FIG. 5 shows an enlarged view of the example signature marking 400 in accordance with some embodiments. This view shows the collected fragment portions 110a, 110b, 110c, 110d forming the unified signature marking 400 viewed from the front orientation of portable radio 100. The processor 122 of FIG. 1 performs image analytics on an image scan taken at a first orientation of the portable radio 100. The scan is compared to pre-approved signature images and location. To verify the unified signature, a second scan taken from a second orientation (such as FIG. 4B) is taken and image analytics performed thereon. Again, the analytics compare the scanned image to pre-approved images and location information, to determine whether the location of each fragment 110a, 110b, 110c, 110d aligns with an assigned pre-approved location stored within the memory 124. For example, fragment 110a is on the front housing, 110b is on a predetermined module, 110c is on the pcb, and 110d is on the back housing. Once the locations are verified, the images of the fragmented signature portions may be combined and displayed as a unified signature at verification output, as was shown in FIG. 1.

While taking one x-ray scan may show a complete signature on a first orientation of the radio (such as a completed signature determined by a front radio view x-ray scan), the verification is further enhanced by determining that signature fragments are disposed on different predetermined locations (for example disposed on different locations determined by a perspective view x-ray scan of the radio).

FIG. 6 is a flowchart of a method 600 for inspecting an electronic device, in accordance with some embodiments.

The method 600 begins at 602 by receiving, at a server electronic processor (such as that shown in FIG. 1), one or more x-ray images of an electronic device, such as portable radio 100 of FIG. 1. The x-ray image may be taken as a single x-ray scan of the electronic oriented to a position, as controlled by the server electronic processor, for detecting fragmented signatures portions. Alternatively, the x-ray images may be first and second x-ray images taken from different views of the electronic device, as controlled by the electronic processor, wherein one view is oriented for detecting a complete signature, and another view is oriented for detecting fragmented portions of the signature.

The method continues to 604 with performing; using the server electronic processor, image analytics on the retrieved x-ray image(s). The method continues to 606 with identifying, via the image analytics, a plurality of different fragmented signature portions disposed within the electronic device and fragment locations. For example, the image analytics of the x-ray scan may determine fragmented portions of a signature disposed on different housing portions, nodules and components.

At 606, the server's image analytics automatically collect the plurality of fragmented signature portions and determine at 608 if the collected fragments are combinable to form a complete signature that matches a pre-approved signature stored in memory. The server's image analytics may further verify that the fragmented signature portions are located in accordance with pre-approved locations stored in server memory. For example, determining if the collected fragments are combinable to form a complete signature may further comprise generating a processor generated electronic marking based on the collected fragments with identified locations associated with the collected fragments and comparing the processor generated electronic marking to a pre-approved signature stored within a memory of the server.

For embodiments using first and second x-ray scans, a first scan may detect a combined signature at a first orientation of the electronic device and analytics performed thereon to determine a match to the pre-approved signature stored in memory, and another x-ray scan taken, to identify, via image analytics, a plurality of different fragmented signature portions disposed within the electronic device and fragment locations, such as was performed at 604, 606. When more than one x-ray scan is used, the order of the scans and image analytics performed thereon may be changed. For example, the server may receive an x-ray image associated with an orientation known to be associated with the fragmented signature portions, and receive another x-ray image associated taken in a different orientation associated with the complete signature, for comparison to the pre-approved complete signature stored within the memory of the server.

At 610, the server generates a notification indicating: a complete combined signature, with no missing fragment, being indicative of a valid, non-counterfeit electronic device; a missing fragment being indicative of a counterfeit component or counterfeit module; and a missing of all fragments being indicative of a counterfeit electronic device.

The notification output may be sent to the I/O interface of the server or device operatively coupled to the server of FIG. 1. The method 600 may further include receiving, at the server, periodic updates that vary the updated complete signature and the locations upon which the fragmented portions are disposed. As discussed earlier, these periodic updates help minimize the potential for non-approved components or modules to be substituted into an electronic product.

Accordingly, there has been provided an improved method apparatus and system for detecting counterfeit electronic products. The embodiments have provided not only for detecting an entire counterfeit electronic device but also the ability to identify non-approved substitutions of modules or components. The embodiments allow for updates to the signature marking and updates to the locations of the marking's associated fragmented signature portions. The variability of placement provides an extra level of security to ensuring authentic product and modules/components.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable radio, comprising:
a housing containing a plurality of electronic modules and components;
a fragmented signature marking comprising different signature portions dispersed amongst the housing and electronic modules and components, the fragmented signature marking being invisible to a human eye and detectable by an x-ray device, wherein the electronic modules and components comprise discrete, separately manufactured parts assembled within the housing;
the fragmented signature marking being configured to form a processor detectable image wherein:
a complete combined signature marking, with no missing fragment, indicative of a valid, non-counterfeit radio;
a missing fragment being indicative of a counterfeit component or counterfeit module; and
a missing of all fragments being indicative of a counterfeit radio; and further:
wherein the portable radio provides for a non-destructive automated internal inspection of a multi-component portable radio.

2. The portable radio of claim 1, wherein the fragmented signature marking comprises dissimilar fragmented signature portions.

3. The portable radio of claim 2, wherein the dissimilar fragmented signature portions are located at different locations on the electronic modules and components.

4. The portable radio of claim 1, wherein the processor detectable image is configured for detection by image analytics for comparison to previously stored complete signatures stored within a memory of a server.

5. The portable radio of claim 1, wherein the processor detectable image is detectable by image analytics using optical character recognition (OCR).

6. The portable radio of claim 1, wherein the completed combined signature is determinable by image analytics in a first x-ray scan of the radio in a first orientation; and the fragmented signature marking dispersed amongst the housing and electronic modules and components is determinable by image analytics in a second x-ray scan of the radio in a second orientation.

7. The portable radio of claim 1, wherein the completed combined signature is determinable by image analytics of a first x-ray scan of the radio in a front orientation; and the fragmented signature marking dispersed amongst the housing and electronic modules and components is determinable by image analytics in a second x-ray scan of a perspective view of the radio.

8. The portable radio of claim 1, wherein:
the x-ray device comprises a computer tomography (CT) device, which rotates 360° and constructs a full 3D model of the fragmented signature markings across the components, modules and housing of the portable radio.

9. The portable radio of claim 1, wherein the electronic modules and components comprise multi-surface discrete, separately manufactured parts assembled within the housing.

10. A method for inspecting an electronic device comprising discrete, separately manufactured electronic modules and components assembled within a housing, comprising:
receiving, from an x-ray device, at a server electronic processor, an x-ray image associated with the electronic device comprising the discrete, separately manufactured electronic modules and components assembled within the housing;
performing, using the server electronic processor, image analytics on the x-ray image;
identifying a plurality of different fragmented signature portions disposed within the electronic device upon the discrete separately manufactured electronic modules and components assembled within the housing;
automatically collecting the plurality of fragmented signature portions;
determining if the collected fragments are combinable to form a complete signature; and
generating a notification indicating:
a non-counterfeit electronic device in response to a complete combined signature, with no missing fragments;
a counterfeit component or counterfeit module of the electronic device in response to a missing fragment; and
a counterfeit electronic device in response to missing all fragments; and further:
wherein the method provides a non-destructive automated internal inspection of a multi-component electronic device.

11. The method of claim 10, wherein performing the image analytics on the x-ray image further comprises identifying locations of the fragmented signature portions amongst the components, modules and housing, and comparing the locations to determine alignment with pre-approved locations stored within a memory of the server.

12. The method of claim 10, further comprising receiving another x-ray image wherein determining if the collected fragments are combinable to form a complete signature further comprises:

generating a processor generated electronic marking based on the collected fragments with identified locations associated with the collected fragments; and comparing the processor generated electronic marking to a pre-approved signature stored within a memory of the server.

13. The method of claim 10, further comprising receiving, at the server, another x-ray image associated with the electronic device taken in a different orientation associated with the complete signature.

14. The method of claim 10, further comprising:

receiving, at the processor, periodic updates that vary the complete signature and associated locations upon which the fragmented signature portions are disposed.

15. The method of claim 10, wherein:

the x-ray device utilizes computer tomography (CT), which rotates 360° and constructs a full 3D model of the fragmented signature markings across the components, modules and housing of the electronic device.

16. The method of claim 10, wherein the fragmented signature is invisible to a human eye and detectable by an x-ray device.

17. A communication system for electronic device inspection, comprising:

a server having an electronic processor configured to:

receive, an x-ray image associated with an electronic device, the electronic device comprising discrete, separately manufactured electronic modules and components assembled within an electronic device housing, at a cargo entry point;

perform image analytics on the x-ray image;

identify a plurality of different fragmented signature portions disposed within the electronic device upon the discrete, separately manufactured electronic modules and components and electronic device housing;

automatically collect the plurality of different fragmented signature portions;

determine if the collected fragmented signature portions are combinable to form a complete signature; and generate a notification indicating:

a valid, non-counterfeit radio in response to a complete combined signature, with no missing fragment;

counterfeit component or counterfeit module in response to missing a fragment of a complete signature; and a counterfeit electronic device in response to missing all fragments of a complete signature; and further:

wherein the communication system provides a non-destructive automated internal inspection of a multi-component electronic device.

18. The communication system of claim 17, wherein the server operates as part of a cloud-based network of a customs and border protection (CBP) agency.

19. The communication system of claim 18, wherein access to the server is provided over a cloud-based network to a pre-approved manufacturer of electronic devices for updating the server with updated images of the different fragmented signature portions and updated locations upon which the updated fragmented signature portions are disposed.

20. The communication system of claim 17, wherein the image analytics, performed by the server determine identifying locations of the fragmented signature amongst the components, modules and housing, and the processor compares the locations to determine alignment with pre-approved locations stored within a memory of the server.

21. The communication system of claim 17, wherein the processor being configured to determine if the collected fragmented signature portions are combinable to form a complete signature further comprises the electronic processor being configured to:

generate a processor generated electronic marking based on the collected fragmented signature portions and identified locations associated with each collected fragment; and compare the processor generated electronic marking to a pre-approved complete signature stored within a memory of the server.

22. The communication system of claim 17, wherein the server receives another x-ray image associated with the electronic device taken in a different orientation associated with the complete signature for comparison to a pre-approved complete signature stored within a memory of the server.

23. The communication system of claim 17, wherein the server receives periodic updates to the complete signature and periodic updates associated with locations upon which the fragmented signature portions are disposed.

24. The communication system of claim 17, wherein the electronic device is a portable radio.

25. The communication system of claim 17, wherein:

the x-ray device utilizes computer tomography (CT), which rotates 360° and constructs a full 3D model of the fragmented signature markings across the components, modules and housing of the electronic device.

26. The communication system of claim 17, wherein the fragmented signature is invisible to a human eye and detectable by an x-ray device.

* * * * *